(12) United States Patent
Revellat et al.

(10) Patent No.: US 9,540,889 B2
(45) Date of Patent: Jan. 10, 2017

(54) COILED TUBING GAMMA RAY DETECTOR (75) Inventors: Guillaume Revellat, Paris (FR); Robert Van Kuijk, Le Plessis Robinson (FR); Robert Greenaway, Frimley Surrey (GB); Sarmad Adnan, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 707 days.

(21) Appl. No.: 12/617,861

(22) Filed: Nov. 13, 2009

(65) Prior Publication Data
US 2010/0089571 A1    Apr. 15, 2010

Related U.S. Application Data (63) Continuation-in-part of application No. 12/575,024, filed on Oct. 7, 2009, which is a continuation-in-part of application No. 11/135,314, filed on May 23, 2005, now Pat. No. 7,617,873, said application No.

(60) Provisional application No. 60/575,327, filed on May 28, 2004.
(Continued)

(51) Int. Cl.
*E21B 17/20* (2006.01)
*G01V 5/00* (2006.01)
*E21B 47/12* (2012.01)

(52) U.S. Cl.
CPC ........... *E21B 17/206* (2013.01); *E21B 47/123* (2013.01); *G01V 5/00* (2013.01)

(58) Field of Classification Search
None
See application file for complete search history.

(56) References Cited

U.S. PATENT DOCUMENTS

| | | |
|---|---|---|
| 2,558,427 A | 6/1951 | Fagan |
| 3,348,616 A | 10/1967 | Zingg |
| 4,856,584 A | 8/1989 | Seidner |

(Continued)

FOREIGN PATENT DOCUMENTS

| | | |
|---|---|---|
| DE | 2818656 A1 | 10/1979 |
| DE | 29816469 U1 | 12/1998 |

(Continued)

OTHER PUBLICATIONS

Otto S. Wolfbeis, Leonie J. Weis, Marc J.P. Leiner and Werner E. Ziegler, Fiber-Optic Fluorosensor for Oxygen and Carbon Dioxide; Analytical Chemistry; 1986, pp. 2028-2030; vol. 60 No. 19; Analytical Division, Institute of Organic Chemistry, Karl-Franzens University, 8010 Graz, Austria.
(Continued)

*Primary Examiner* — Angela M DiTrani
(74) *Attorney, Agent, or Firm* — Jeffrey R. Anderson; Michael L. Flynn; Tim Curington (57) ABSTRACT

A downhole tool for use in coiled tubing well operations. The tool includes a gamma ray detector for determining well location information for an associated coiled tubing application. The well location information may relate to well depth and/or the locating and identifying of a particular side branch or lateral leg of the well. Additionally, the gamma ray detector may be utilized to monitor dynamic well conditions in real-time such as the flow of injected fluids or the effectiveness of clean out applications via the coiled tubing.

22 Claims, 5 Drawing Sheets

Related U.S. Application Data

12/617,861 is a continuation-in-part of application No. 11/958,756, filed on Dec. 18, 2007, now abandoned.

(56) References Cited

U.S. PATENT DOCUMENTS

| | | | | |
|---|---|---|---|---|
| 4,859,054 | A | 8/1989 | Harrison | |
| 4,904,865 | A * | 2/1990 | Meisner | G01V 5/06 250/254 |
| 4,926,940 | A * | 5/1990 | Stromswold | 166/247 |
| 5,284,207 | A | 2/1994 | Bittleston et al. | |
| 5,419,395 | A * | 5/1995 | Harvey | E21B 47/01 166/241.6 |
| 5,434,395 | A | 7/1995 | Storck et al. | |
| 5,485,745 | A * | 1/1996 | Rademaker et al. | 73/152.39 |
| 5,542,471 | A | 8/1996 | Dickinson | |
| 5,573,225 | A | 11/1996 | Boyle | |
| 5,597,042 | A * | 1/1997 | Tubel et al. | 166/250.01 |
| 5,944,123 | A | 8/1999 | Johnson | |
| 5,965,826 | A | 10/1999 | Bertrab | |
| 5,992,250 | A | 11/1999 | Kluth et al. | |
| 6,009,216 | A | 12/1999 | Pruett et al. | |
| 6,062,311 | A | 5/2000 | Johnson et al. | |
| 6,079,281 | A | 6/2000 | Oszajca et al. | |
| 6,157,893 | A | 12/2000 | Berger et al. | |
| 6,173,771 | B1 | 1/2001 | Eslinger et al. | |
| 6,192,983 | B1 | 2/2001 | Neuroth et al. | |
| 6,247,536 | B1 | 6/2001 | Leismer et al. | |
| 6,276,454 | B1 | 8/2001 | Fontona et al. | |
| 6,281,489 | B1 | 8/2001 | Tubel et al. | |
| 6,349,768 | B1 | 2/2002 | Leising | |
| 6,397,864 | B1 | 6/2002 | Johnson | |
| 6,419,014 | B1 | 7/2002 | Meek et al. | |
| 6,474,152 | B1 | 11/2002 | Mullins et al. | |
| 6,519,568 | B1 | 2/2003 | Harvey et al. | |
| 6,534,449 | B1 | 3/2003 | Gilmour et al. | |
| 6,581,455 | B1 | 6/2003 | Berger et al. | |
| 6,667,280 | B2 | 12/2003 | Chang et al. | |
| 6,789,621 | B2 | 9/2004 | Wetzel et al. | |
| 6,817,410 | B2 | 11/2004 | Wetzel et al. | |
| 7,055,604 | B2 | 6/2006 | Jee et al. | |
| 7,073,582 | B2 | 7/2006 | Connell et al. | |
| 7,077,200 | B1 | 7/2006 | Adnan et al. | |
| 7,152,685 | B2 | 12/2006 | Adnan et al. | |
| 7,182,134 | B2 | 2/2007 | Wetzel et al. | |
| 7,182,434 | B2 | 2/2007 | Silverbrook et al. | |
| 7,207,216 | B2 | 4/2007 | Meister et al. | |
| 7,308,941 | B2 | 12/2007 | Rolovic et al. | |
| 7,565,834 | B2 | 7/2009 | Adnan et al. | |
| 7,597,142 | B2 | 10/2009 | Hartog et al. | |
| 7,654,318 | B2 | 2/2010 | Cooper et al. | |
| 2001/0050172 | A1 * | 12/2001 | Tolman et al. | 166/297 |
| 2002/0007945 | A1 | 1/2002 | Neuroth et al. | |
| 2004/0040707 | A1 * | 3/2004 | Dusterhoft et al. | 166/279 |
| 2004/0045705 | A1 | 3/2004 | Gardner et al. | |
| 2004/0067002 | A1 * | 4/2004 | Berg | G01V 11/00 385/12 |
| 2004/0104052 | A1 * | 6/2004 | Livingstone | 175/61 |
| 2004/0129418 | A1 | 7/2004 | Jee et al. | |
| 2005/0016730 | A1 | 1/2005 | McMechan et al. | |
| 2005/0126777 | A1 | 6/2005 | Rolovic et al. | |
| 2005/0236161 | A1 | 10/2005 | Gay et al. | |
| 2005/0263281 | A1 * | 12/2005 | Lovell et al. | 166/255.1 |
| 2006/0044156 | A1 | 3/2006 | Adnan et al. | |
| 2007/0137860 | A1 | 6/2007 | Lovell et al. | |
| 2007/0227741 | A1 | 10/2007 | Lovell et al. | |
| 2008/0041594 | A1 | 2/2008 | Boles et al. | |
| 2008/0073077 | A1 | 3/2008 | Tunc et al. | |
| 2008/0134774 | A1 | 6/2008 | Oddie | |
| 2008/0142212 | A1 * | 6/2008 | Hartog et al. | 166/250.01 |
| 2008/0210427 | A1 | 9/2008 | Ziauddin et al. | |
| 2008/0236836 | A1 | 10/2008 | Weng | |
| 2009/0084536 | A1 | 4/2009 | Kenison et al. | |

FOREIGN PATENT DOCUMENTS

| | | |
|---|---|---|
| EP | 0203249 B1 | 12/1986 |
| EP | 0853249 A1 | 7/1998 |
| GB | 2177231 A | 1/1987 |
| GB | 2275953 A | 9/1994 |
| GB | 2299868 A | 10/1996 |

OTHER PUBLICATIONS

M. H. Maher and M.R. Shahriari, A Fiber Optic Chemical Sensor for Measurement of Groundwater pH; Journal of Testing and Evaluation JTEVA; 1993; pp. 448-452; vol. 21, No. 5; Rutgers University, Piscataway, New Jersey.

Eslinger, David et al., A Hybrid Milling/Jetting Tool—The Safe Solution to Scale Milling, Society of Petroleum Engineers Inc., Houston, Texas, Apr. 5-6, 2000, SPE 60700, pp. 1-6.

Johnson, Ashley et al., An Abrasive Jetting Scale Removal System, Society of Petroleum Engineers Inc., Houston, Texas, Apr. 15-16, 1996, SPE 46026, pp. 1-6.

Office Action issued in related MX application MX/a/2010/012316 on May 18, 2015, 10 pages.

* cited by examiner

COILED TUBING GAMMA RAY DETECTOR

CROSS REFERENCE TO RELATED APPLICATION

The present document is a Continuation in Part claiming priority under 35 U.S.C. §120 to U.S. patent application Ser. No. 12/575,024, filed on Oct. 7, 2009 and published as U.S. Patent Publication No. 2010/0018703 and entitled, "System and Methods Using Fiber Optics in Coiled Tubing", which is a Continuation of U.S. patent application Ser. No. 11/135,314, filed on May 23, 2005 and published as U.S. Patent Publication No. 2005/0263281 and entitled, "System and Methods Using Fiber Optics in Coiled Tubing", which in turn claims priority under 35 U.S.C. §119(e) to U.S. Provisional Patent Application Ser. No. 60/575,327, filed on May 28, 2004 and entitled, "System and Method for Coiled Tubing Operations Using Fiber Optic Measurements and Communication", the disclosures of which are each incorporated herein by reference in their entirety. The present document is also a Continuation in Part claiming priority under 35 U.S.C. §120 to U.S. patent application Ser. No. 11/958,756, filed on Dec. 18, 2007 and published as U.S. Patent Publication No. 2009/0151936 and entitled, "System and Method for Monitoring Scale Removal from a Wellbore".

FIELD

Embodiments described relate to a coiled tubing detector and associated techniques for acquiring static and dynamic well characteristic information. In particular, tools and techniques are described that allow for determining tool location in a well along with the capacity to monitor changing well conditions in real-time.

BACKGROUND

Exploring, drilling and completing hydrocarbon and other wells are generally complicated, time consuming and ultimately very expensive endeavors. In recognition of these expenses, added emphasis has been placed on well logging, profiling and monitoring of well conditions. Over the years, the detecting and monitoring of well conditions has become a more sophisticated and critical part of managing well operations.

Initial gathering of information relative to well and surrounding formation conditions may be obtained by running a logging tool in the well. The logging tool may be configured to acquire temperature, pressure, acidity and other well condition information. A map of the acquired information may be generated resulting in an overall profile of the well which may be of great value in subsequent monitoring and servicing of the well as noted below.

Servicing of the well is often performed by way of coiled tubing applications, particularly in the case of deviated wells. Coiled tubing applications involve the deployment of a string of narrow pipe through the well which is capable of delivering treatment fluids and carrying out a variety of downhole servicing applications. Of course, in order to effectively carry out any given application, the true position or location of the coiled tubing and associated tools should be known. Without such information, an otherwise effective application may be run at the wrong location in the well. By the same token, monitoring of a given application may also help to ensure that the application is effectively initiated and carried out to completion.

Generally, in order to establish the location of coiled tubing, a casing collar locator (CCL) is incorporated into the toolstring at the end of the coiled tubing. In order to provide location information, a CCL relies on the presence of intermittently dispersed casing collars of well casing defining the well. That is, a cased well generally consists of a series of equal length casing segments jointed to one another by casing collars. So, for example, where typical 30 ft. casing segments are employed in defining the inner wall of a cased well, a casing collar may be found every 30 feet throughout the well. In this manner, casing collar detection may be acquired as the application tool is advanced through the well. Thus, accurate positioning of the application tool may be ensured. CCL's are generally available in flow-through configurations and thus, work particularly well with coiled tubing applications.

Unfortunately, CCL's may only be utilized in situations where the well is cased. That is, where no casing or casing collars are present, such as the circumstance of an open-hole well, CCL's are unable to provide any location information. Furthermore, while location in terms of well depth of a cased well may be established with a CCL, other types of location information may not be determined with such a locator. For example, often times the well architecture includes a variety of downhole offshoots or 'lateral legs' which branch off from the main vertical channel of the well. When this is the situation, not even casing of the well and lateral legs would allow a CCL to provide information relative to the particular lateral leg within which the coiled tubing and toolstring are disposed. That is, while sometimes a decent indicator of well depth, the CCL is unable to provide any more specific information as to the whereabouts of the coiled tubing and toolstring.

In addition to the above noted deficiencies of a CCL for open-hole or lateral leg applications, the CCL often fails to provide adequate location information even in cased wells of fairly unsophisticated architecture. For example, accuracy of the CCL requires the detection of every casing collar traversed. That is, with the above casing example in mind, the accuracy of the depth information arising from the CCL will be off by 30 feet for every collar the CCL fails to detect. Unfortunately, failure to detect a collar is not an uncommon occurrence, particularly as wells become deeper and deeper with an ever increasing number of casing collars to be detected. As such, keeping with the noted casing example, the odds of a coiled tubing application being directed to a downhole location that is 30, 60, or 90 feet off target is a distinct possibility. Thus, an ineffective clean out, misapplied fracturing, or other erroneous coiled tubing application may be likely.

As noted above, static well location information, as such relates to the coiled tubing, may play a significant role in the effectiveness of the coiled tubing application to be carried out. As also alluded to, dynamic well condition information, relative to the coiled tubing application, may also be quite beneficial. For example, monitoring a rate or degree of a clean out may avoid significant expenses associated with having to re-run the application due to ineffectiveness or incompleteness. Unfortunately, however, a coiled tubing tool equipped for static well detections such as a CCL is unable to provide such dynamic well condition information.

SUMMARY

A method of establishing a location downhole in a well is provided for coiled tubing applications. The method includes deploying a coiled tubing assembly into a well with a fiber optic line running therethrough. A gamma ray detector is coupled to the fiber optic line for detecting gamma ray well formation characteristics. As such, the tool may be used to establish a location within the well in real-time. The location may provide well depth information as well as the determination of a particular lateral leg or side branch of the well.

In another method, a coiled tubing assembly is deployed into the well. Again, a fiber optic line is run through the assembly to a gamma ray detector. An application is then run in the well that utilizes a fluid with a tracer substance having a pre-determined detectability relative to the detector. Thus, a dynamic condition of the application fluid may be monitored during the application.

DETAILED DESCRIPTION

Embodiments are described with reference to certain downhole coiled tubing applications taking advantage of an available gamma ray detector. For example, embodiments herein focus on an application assembly that includes an isolation tool with incorporated fracture mechanism for a downhole fracturing application in an open-hole well. However, a variety of coiled tubing applications may be employed that take advantage of an incorporated gamma ray detector. For example, a gamma ray detector may be utilized in conjunction with a coiled tubing cementing application or injection applications for monitoring gas or water flow. Indeed, a gamma ray detector may be employed in conjunction with any number of coiled tubing applications to provide well location information, regardless of any follow-on application monitoring. Regardless, embodiments described herein include an assembly which employs a gamma ray detector to attain well characteristic information in real-time, for example, to determine well location information and/or ongoing well application monitoring.

Figure 1:
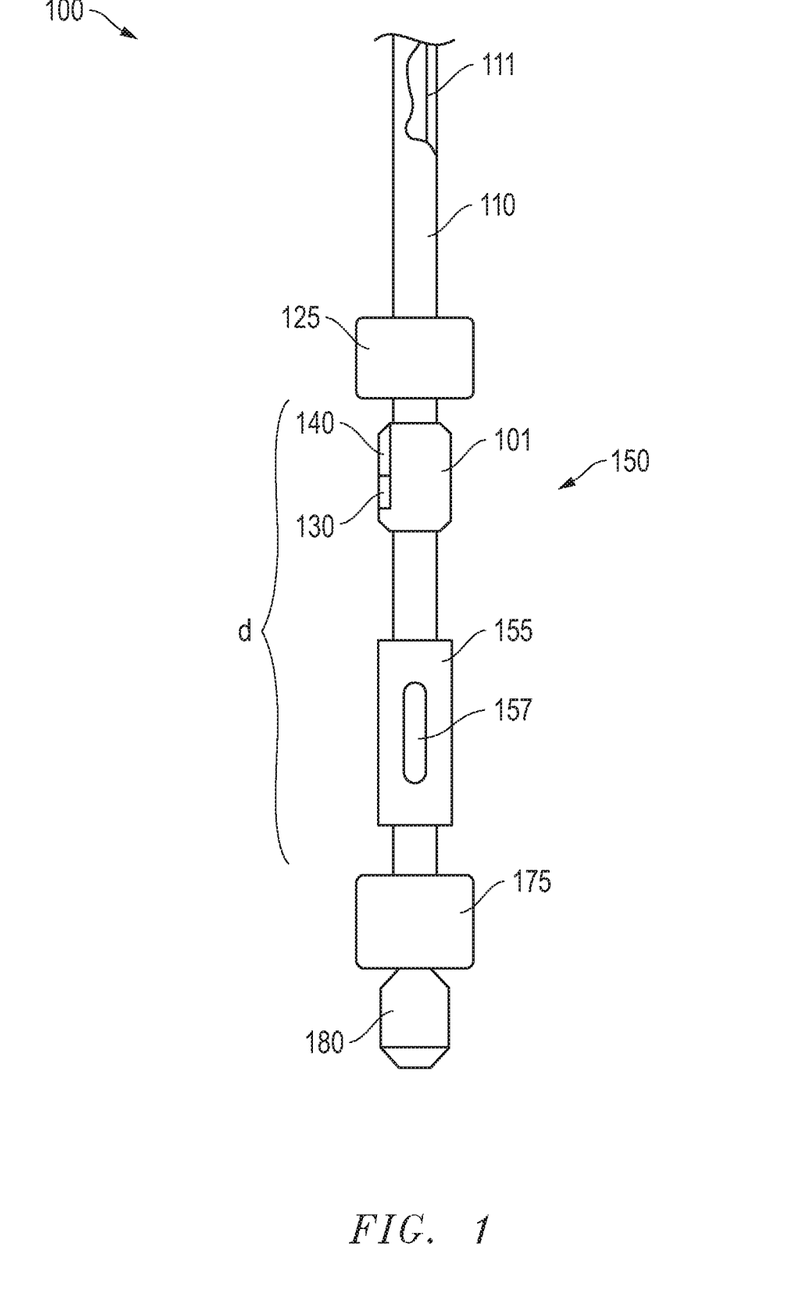
FIG. 1 is a side view of an embodiment of a downhole application assembly employing a gamma ray detector.
Figure 2:
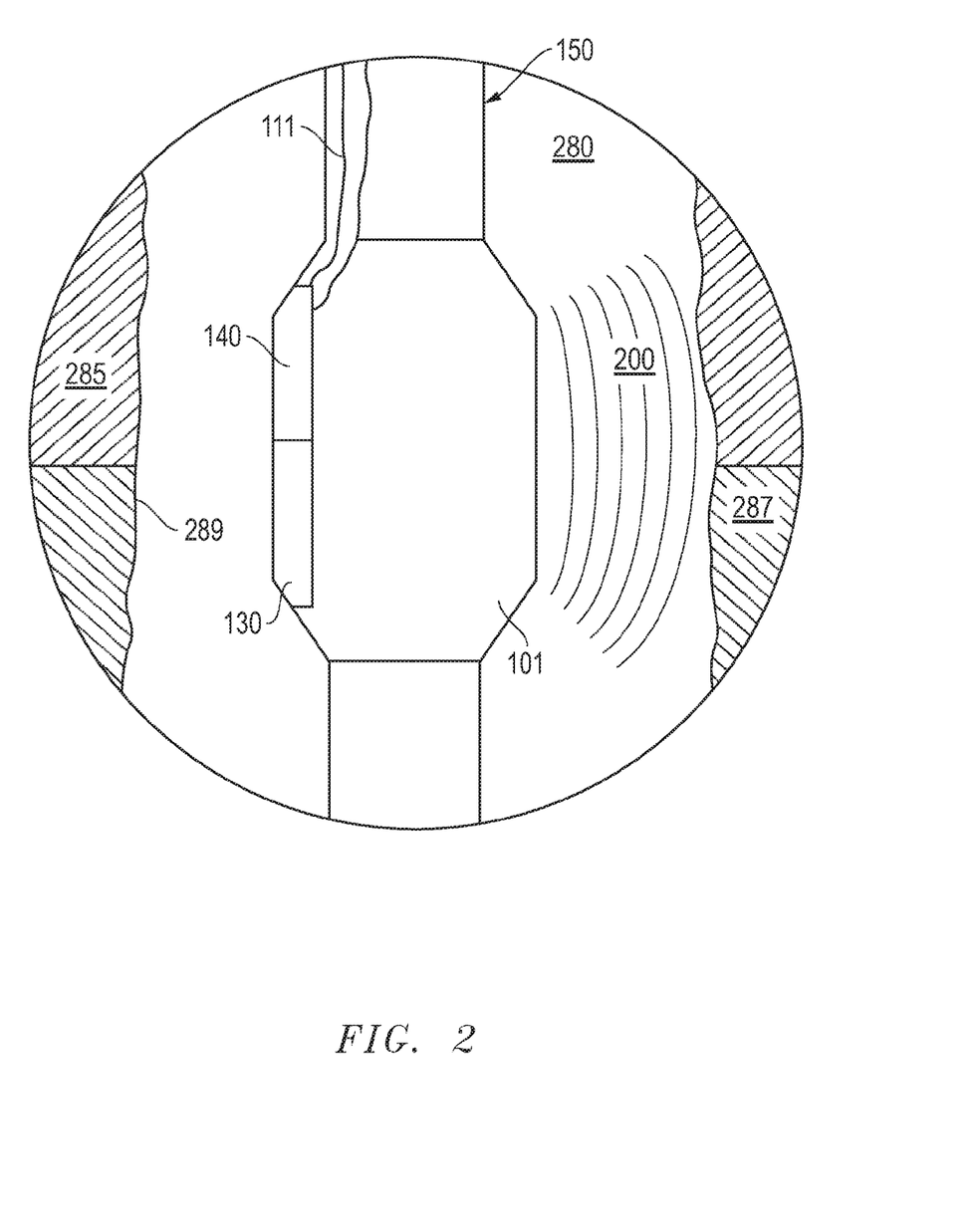
FIG. 2 is an enlarged side view of the gamma ray detector of FIG. 1 employed for establishing a location of the assembly in an open-hole well.

Referring now to FIG. 1, with additional reference to FIG. 2, a side view of an embodiment of a downhole application assembly 100 is depicted. The assembly 100 includes coiled tubing 110 for positioning of a downhole application device such as an isolation tool 150 in a well 280. As detailed below, a gamma ray detector 101 is incorporated into the assembly 100 at the isolation tool 150. The detector 101 may be utilized to establish and monitor the location of the assembly 100 in the well 280. The isolation tool 150 includes a fracture mechanism 155 with delivery port 157 as detailed further below, for delivery of a slurry 400, 500 during a fracturing operation (see FIGS. 4 and 5). Thus, the gamma ray detector 101 may also be employed to monitor the fracturing operation.

Figure 3:
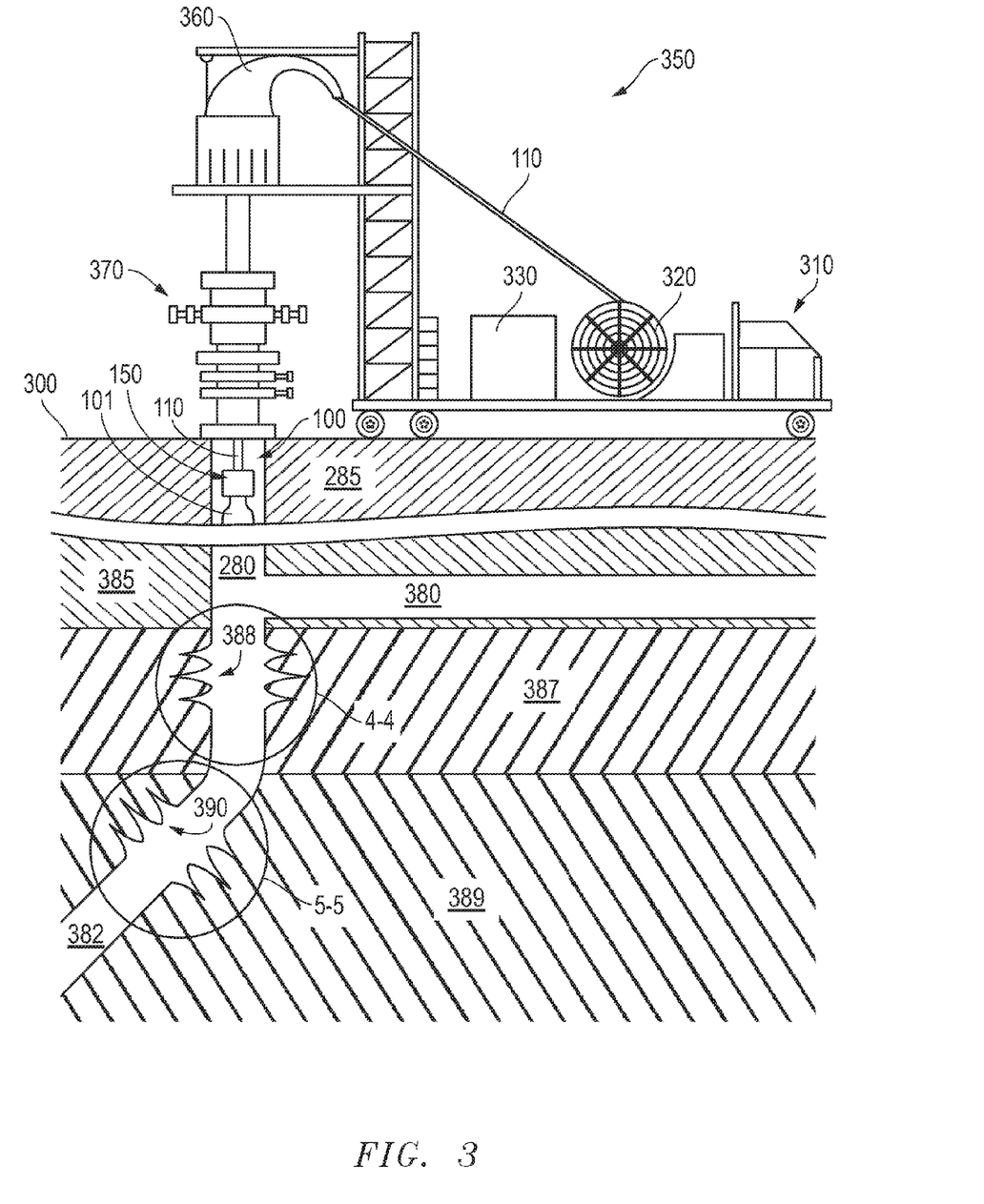
FIG. 3 is an overview of an oilfield accommodating the well of FIG. 2 with the application assembly disposed therein.

With added reference to FIG. 3, a fiber optic line 111 is run through the coiled tubing 110 so as to maintain communication between the downhole application assembly 100 and equipment 350 at the surface of an oilfield 300. More specifically, an opto-electric interface 140 of the gamma ray detector 101 may be provided for physical coupling to the fiber optic line 111. The interface 140 in turn may be coupled to an electronics housing 130 for processing and relaying of information obtained by and/or directed to the gamma ray detector 101. That is to say, with a fiber optic line 111 and proper downhole electronics, real-time communication may be maintained between the tool 101 and surface equipment 350. So, for example, the location of the assembly 100 within the well 280 as determined by the gamma ray detector 101 may ultimately be tracked at a control unit 330 throughout operations.

The fiber optic line 111 may include a jacket of durable corrosion resistant metal surrounding a single fiber or multiple fiber bundle. The fiber optic nature of the line 111 allows for reliable high speed data transfer there-over. Additionally, the line 111 is of substantially low profile and weight. For example, the line 111 may weigh substantially less than about ⅓ lb. per foot while also contributing substantially less than about 25% to the overall weight of the assembly 100. All in all, the line 111 may be of no more than about 0.25 inches in diameter, preferably less than about 0.125 inches. Thus, even though disposed within a coiled tubing 110, a suitable channel remains for carrying slurry 400, 500 during a fracturing application (see FIGS. 4 and 5).

In addition to providing location information, information related to the progress of a fracturing application may be acquired by the gamma ray detector 101. Again, such information may be monitored in real-time at the control unit 330 (see FIG. 3). Additionally, in order to allow for the utilization of the gamma ray detector 101 in conjunction with a fracturing operation, the tool 101 may be configured with a flow-through design. Thus, slurry 400, 500 may be advanced through the gamma ray detector 101 during a fracturing application as with the coiled tubing 110, fracture mechanism 155 and other portions of the assembly 100 (see FIGS. 4 and 5).

Figure 4:
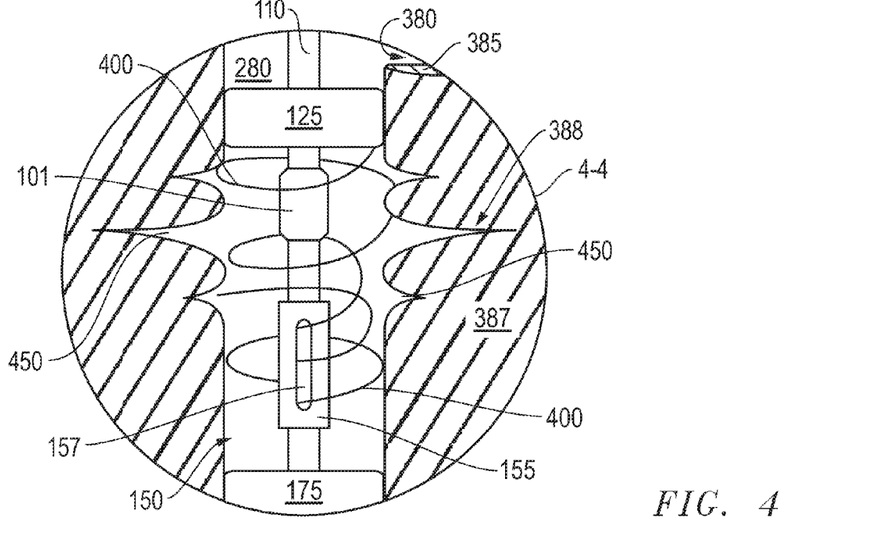
FIG. 4 is an enlarged side view of the application assembly employed in a fracturing application at a first well location.
Figure 5:
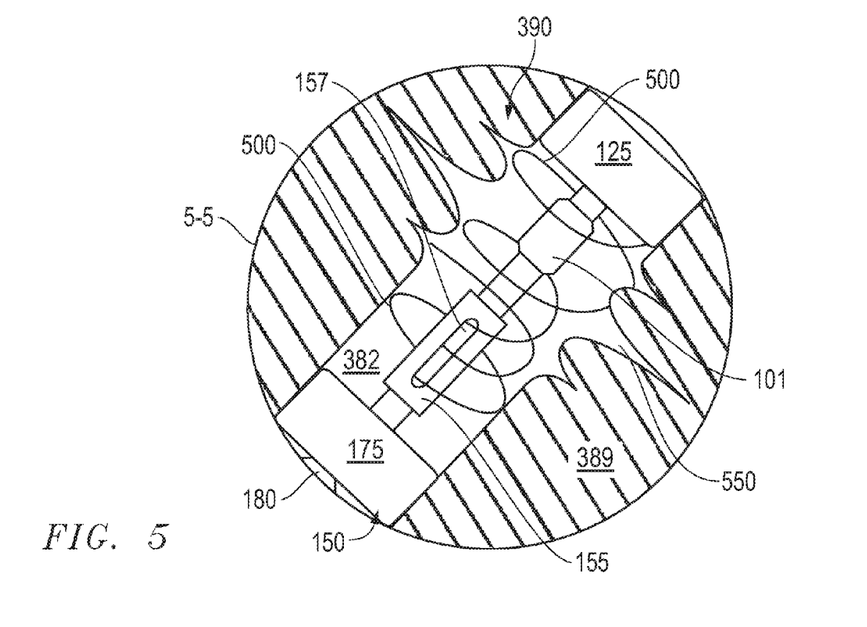
FIG. 5 is an enlarged side view of the application assembly employed in a fracturing application at a second well location.

Continuing with reference to FIG. 1, the isolation tool 150 is equipped with expandable packer seals 125, 175 separated by a given distance (d). For example, in the embodiments shown, the distance d may be between about 5 feet and about 20 feet so as to correspond with the length of production regions 388, 390 as depicted in FIGS. 3-5. As detailed below, fracturing takes place over this distance d via the fracture mechanism 155 when positioned adjacent at such regions 388, 390.

Other electronic equipment and sensors may be housed within a head 180 of the assembly 100. For example, components for monitoring pressure, temperature and other well characteristics may be stored in the head 180 along with a downhole power source. As depicted, the head 180 and accompanying components are located outside of the above noted distance d whereas the gamma ray detector 101 is positioned within the noted distance d. So, for example, pressure and temperature readings acquired by components of the head 180 may be unrelated to any particular real-time aspect of fracturing operations. As detailed below, however, the gamma ray detector 101 is well positioned within the distance d for monitoring such fracturing in real-time.

While the head 180 is depicted outside of the distance d in FIG. 1, such may be a matter of design choice. For example, in alternate embodiments, it may be desirable to have a downhole power source located in closer proximity to the gamma ray detector 101 or electronics housing 130. It may also be desirable to position pressure, temperature and other sensors within the distance d for the acquisition of additional information directly associated with a fracturing application. In such embodiments the head 180 or noted components thereof may be incorporated into the isolation tool 150 within the noted distance d.

Referring now to FIG. 2, an enlarged side view of the gamma ray detector 101 of FIG. 1 is shown. As part of the larger isolation tool 150, the gamma ray detector 101 is shown disposed within an open-hole well 280. Thus, as detailed further below, the gamma ray detector 101 is well suited for acquiring a gamma ray profile or signature from exposed formation layers 285, 287 defining the well 280. That is, as opposed to a cased well with collars at predetermined locations, the well 280 is of an open-hole variety with irregular exposed formation wall 289. Nevertheless, unlike a casing collar locator, the gamma ray detector 101 is configured to allow for establishing downhole location based on the noted signature of the formation layers 285, 287. For example, a reference gamma ray profile is generally established during a log of the well 280 run prior to any interventional and/or coiled tubing applications as described herein. As such, subsequent monitoring of formation gamma ray signature with the tool 101 provides a real-time indication of well depth and/or location.

Continuing with reference to FIG. 2, the gamma ray detector 101 may include a Sodium Indium (NaI) crystal, photomultiplier and other conventional gamma ray detector components. For sake of illustration, a field 200 is shown within range of the crystal of the detector 101. As naturally occurring gamma ray emissions of the formation layers 285, 287 enter the field 200 and interface the detector 101, they may interact with the crystal in a detectable manner. So, for example, one formation layer 285 may be of shale with a relatively high level of gamma ray radiation. On the other hand, another formation layer 287 may be of sandstone or carbonate rock displaying a comparatively low level of gamma ray radiation. Thus, as these gamma ray detections are made, the gamma ray profile or signature of the well 280 may be determined.

For embodiments detailed herein, the gamma ray signature may be acquired in real-time and compared against a previously generated gamma ray reference log so as to provide well depth and/or location information as noted above. Indeed, such gamma ray location determinations are generally accurate to within about 10 inches or less. Furthermore, while the depicted embodiment of the gamma ray detector 101 is deployed within an open-hole well 280, such an embodiment may also be effectively utilized in a cased well.

With added reference to FIG. 3, the gamma ray detector 101 is also equipped with an opto-electric interface 140 as noted above. A similar interface may also be incorporated into a hub of a coiled tubing reel 320 as shown in FIG. 3. Such interfaces 140 are configured to physically and optically couple to individual fibers of the fiber optic line 111. Simultaneously, the depicted interface 140 may be electronically coupled to electronics of the housing 130 configured to direct and acquire data from the detector 101. Similarly, the interface at the coiled tubing reel 320 may be optically coupled to the line 111 as well as wirelessly coupled to electronics of an application control unit 330. Thus, an application may be directed and data acquired relative the entire downhole assembly 100 of FIG. 1.

Referring now to FIG. 3, an overview of an oilfield 300 is shown accommodating the well 280 of FIG. 2 traversing a variety of formation layers 285, 385, 387, 389. Coiled tubing 110, the isolation tool 150, and the detector 101 of the larger assembly 100 of FIG. 1 are shown disposed in the well 280 for advancement to certain downhole locations as detailed further below. As alluded to above, a control unit 330 is provided for acquiring downhole location data from the gamma ray detector 101. Additionally, the unit 330 is configured to direct a downhole application such as fracturing (see FIGS. 4 and 5). As also alluded to above, wireless communicative capacity may be provided between electronics of the unit 330 and components at a hub of the coiled tubing reel 320. Thus, all communication in either direction from the control unit 330 down to the isolation tool 150 or further may be maintained without a requirement of a cumbersome physical link between the unit 330 and the reel 320.

Continuing with reference to FIG. 3, the noted coiled tubing reel 320 and control unit 330 are delivered to the oilfield 300 by way of a conventional coiled tubing truck 310. A conventional gooseneck injector 360 may be employed to forcibly advance the coiled tubing 110 from the reel 320 and through pressure valve and control equipment 370, often referred to as a "Christmas Tree". Within the well 280, the coiled tubing 110 and depicted portions of the application assembly 100 may be advanced.

Due to the extreme depth and sophisticated architecture of the well 280, only a portion of the noted assembly 100 and top level formation layer 285 are depicted. Indeed, the well 280 includes a highly deviated lateral leg 380, at an upper intermediate formation layer 385 and a slightly deviated leg 382 through a base formation layer 389. Additionally, production regions 388, 390 are found in a lower intermediate formation layer 387 and at the base formation layer 389. Thus, accurate positioning of the isolation tool 150 at the production regions 388, 390 for fracturing may involve an acute level of locating capacity. As detailed with reference to FIGS. 4 and 5 below, such capacity may be afforded by the gamma ray detector 101. Furthermore, real-time monitoring of the fracturing may also be performed by the detector 101.

Referring now to FIG. 4, an enlarged side view of the isolation tool 150 is depicted taken from 4-4 of FIG. 3. In this depiction, the isolation tool 150 is shown secured at an upper production region 388 of the well 280. Previously formed perforations 450 into the adjacent formation 387 are present for hydrocarbon recovery. However, as depicted, a fracturing application is applied at the production region 388 to enhance recovery from the perforations 450. Namely, as described further below, a proppant slurry 400 may be directed through the delivery port 157 of the fracture mechanism 155 at several thousand PSI to stimulate recovery. In the embodiment shown, the slurry 400 includes a proppant of sand, ceramic material or bauxite which may be resin coated. However, a variety of other proppant types are available. Additionally, as also discussed below, a tagging material may be mixed in with the slurry 400 or incorporated into a resin coating thereon.

Stimulation or fracturing as depicted in FIG. 4, begins with the proper positioning of the isolation tool 150 in the production region 388. This is achieved through real-time location information acquired through use of the gamma ray tool 101 as described above. With added reference to FIG. 3, the benefit of utilizing a gamma ray tool 101 for acquisition of real-time location information is apparent. For example, the assembly 100 may be directed downhole without concern over accidental positioning in the lateral leg 380 or elsewhere. Rather, with a gamma ray reference log available for the well 280, precise positioning at the desired location of the production region 388 may be achieved. Thus, packers 125, 175 may be expanded through conventional means to secure the isolation tool 150 in place and allow the fracturing application to proceed.

In addition to the detection of static location information, the gamma ray tool 101 may also be employed to monitor dynamic downhole activity such as delivery and/or re-uptake of the slurry 400 over the course of the fracturing application. That is, as noted above, the slurry 400 may include a tagging material. The tagging material may consist of a tracer substance of a pre-determined detectability by the gamma ray detector 101. Thus, detecting the delivery level of slurry 400, and subsequent recovery, may be monitored in real-time at the surface of the oilfield 300 (see FIG. 3). Alternatively, in other embodiments dynamic downhole conditions may be monitored that don't require the injection of a tracer substance. For example, the removal of debris such as sand, scale and other naturally detectable material may be monitored by the detector 101.

As depicted in FIG. 5, an enlarged view taken from 5-5 of FIG. 3 reveals a subsequent fracturing application directed at a lower production region 390. In this case, the lower production region 390 is located at a base formation layer 385 defining a slightly deviated leg 382 of the well 280. Nevertheless, through use of the gamma ray tool 101, the isolation tool 150 may be re-positioned with a great deal of accuracy in a manner isolating perforations 550 of the region 390. As such, a subsequent fracturing application with delivery of slurry 500 may be carried out in the manner described above regarding fracturing of the upper production region 388. Depending on the particulars of the fracturing application, the slurry 500 may or may not be the same mixture as that employed at the upper production region 388. Regardless, a tagging material may again be utilized so as to allow the gamma ray detector 101 to monitor delivery and/or re-uptake of the slurry 500 over the course of the fracturing application.

Figure 6:
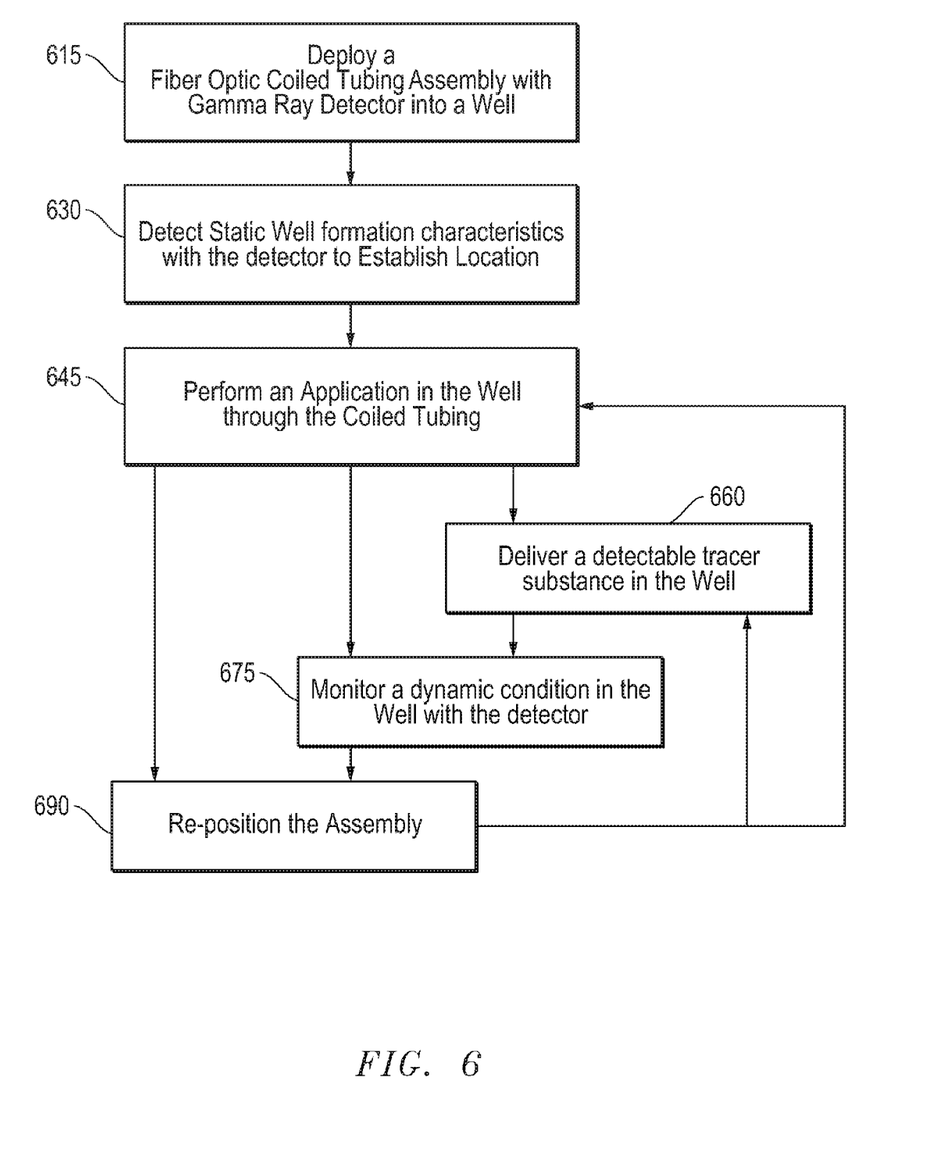
FIG. 6 is a flow chart summarizing an embodiment of employing a downhole application assembly with a gamma ray detector.

Referring now to FIG. 6, a flow chart is depicted summarizing an embodiment of employing a gamma ray detector in conjunction with a fiber optic coiled tubing application. As indicated at 615 and 630, the fiber optic coiled tubing assembly may be deployed into a well and the gamma ray tool employed to provide location data in real-time over the fiber optic line. The location data may be based on static characteristics of the well formation as compared against an available gamma ray reference log. Once properly positioned downhole, an application may be performed via the coiled tubing as indicated at 645. In one embodiment, subsequent re-positioning of the assembly as indicated at 690 may involve no more than removing the assembly from the well. Alternatively, the assembly may be re-positioned for performing of another application as indicated at 645 (and exemplified in the embodiments described with reference to FIGS. 3-5 herein).

In addition to providing location information for follow-on coiled tubing applications, the gamma ray detector may be employed to monitor dynamic well conditions during such applications as indicated at 675. In some circumstances this may include the monitoring of changes in pre-existing well conditions, such as where the coiled tubing application is one of scale removal. However, in other circumstances, such as indicated at 660, the dynamic condition may involve the introduction of a tracer substance which is detectable by the gamma ray detector, for example, to monitor downhole flow conditions.

Embodiments described hereinabove provide tools and techniques for establishing accurate downhole location information for coiled tubing applications even in circumstances where the well is of an open-hole variety. Additionally, incorporation of a flow through gamma ray detector on a coiled tubing assembly allows for determination of dynamic downhole conditions. Thus, with the presence of a fiber optic line between the downhole assembly and surface monitoring equipment, real-time monitoring of changing downhole conditions may be available during coiled tubing applications.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. For example, embodiments herein detail a gamma ray tool employed for the static determination of formation characteristics so as to establish downhole location information for a subsequent fracturing application. However, such a determination may be made for follow-on cleaning, scale removal, matrix acidizing, perforating and other applications. Depending on the nature of the follow-on application, the gamma ray tool may also be employed for dynamic monitoring thereof. Indeed, the gamma ray tool may even be employed for monitoring the dynamic nature of fluid flow where a tagged fluid is injected downhole and allowed to migrate. Furthermore, the foregoing description should not be read as pertaining only to the precise structures described and shown in the accompanying drawings, but rather should be read as consistent with and as support for the following claims, which are to have their fullest and fairest scope.

We claim:

1. A method comprising:
deploying into a well a coiled tubing assembly with a fiber optic line running therethrough to a flow-through gamma ray detector, the fiber optic line disposed within the fluid flow path of the coiled tubing from a well surface to the gamma ray detector;
detecting substantially static gamma ray formation characteristics of the well with the flow-through gamma ray detector;
comparing the substantially static gamma ray formation characteristics with a stored gamma ray reference log for the well;
determining the location of the coiled tubing assembly within the well;
performing an application at the determined location in the well; and
monitoring and detecting gamma rays related to a dynamic condition of the application with the gamma ray detector while performing the application.

2. The method of claim 1 wherein determining comprises relaying information regarding the substantially static gamma ray formation characteristics over the fiber optic line to equipment at an oilfield surface adjacent the well; and
employing the equipment to compute the location from the information.

3. The method of claim 1 wherein the determined location is one of a depth in the well and a lateral leg of the well.

4. The method of claim 1 wherein the application is selected from the group consisting of a fracturing application, a cementing application, a flow-monitoring application, a scale removal application, a clean-out, matrix acidizing, and perforating.

5. The method of claim 1 wherein the location is a first location and the application is a first application, the method further comprising re-positioning the assembly at a second location and performing a second application thereat.

6. The method of claim 5 wherein the first application and the second application are fracturing applications.

7. The method of claim 1 wherein the dynamic condition is one of introducing a substance through the coiled tubing assembly during said performing and altering well conditions at the location during said performing.

8. The method of claim 7 wherein the introducing comprises delivering a tracer substance with a pre-determined detectability relative to the detector for monitoring.

9. The method of claim 8 wherein performing the application comprising performing a fracturing application and wherein performing a fracturing application comprises directing a slurry with the tracer substance mixed therein to the location.

10. The method of claim 7 wherein altering of well conditions comprises moving debris at the location.

11. The method of claim 10 wherein moving debris comprises scale removal.

12. The method of claim 1 wherein deploying comprises deploying a coiled tubing with a fiber optic line, the fiber optic line having a diameter of about 0.125 inches to about 0.25 inches.

13. The method of claim 12 wherein the diameter of the fiber optic line provides a suitable channel within the coiled tubing for carrying fluid for performing the application.

14. A coiled tubing equipment assembly comprising:
    coiled tubing with a fiber optic line running therethrough and configured for deployment in a well;
    a flow-through gamma ray tool comprising a gamma ray detector coupled to a downhole end of the fiber optic line and configured to detect gamma rays to provide well location information in real-time over the fiber optic line during deployment and dynamic well condition information in real-time over the fiber optic line while performing a coiled tubing application;
    a coiled tubing reel to accommodate said coiled tubing and fiber optic line at an oilfield surface and positioned adjacent the well for deployment of the coiled tubing and fiber optic line, the fiber optic line disposed within the fluid flow path of the coiled tubing from the reel to the gamma ray detector; and
    a processing unit for positioning at the oilfield surface adjacent said coiled tubing reel to wirelessly acquire the real-time well location information and the real-time dynamic well condition information therefrom.

15. The assembly of claim 14 wherein the location information relates to one of well depth and positioning relative to a lateral leg of the well.

16. The assembly of claim 14 wherein the dynamic well condition information relates to one of changes of pre-existing well conditions at a well location and changes of materials delivered to the location through the coiled tubing.

17. The assembly of claim 14 further comprising a downhole application device coupled to said coiled tubing.

18. The assembly of claim 17 wherein said downhole application device is an isolation tool for a fracturing application.

19. The assembly of claim 18 wherein the isolation tool comprises:
    a pair of expandable packer seals; and
    a fracturing mechanism disposed at a location between said seals and having a delivery port for introducing a slurry for the fracturing application at the location.

20. The assembly of claim 19 wherein said detector is disposed between said seals, the slurry is detectable by said detector, and the dynamic well condition is the fracturing application.

21. The method of claim 14 wherein deploying comprises deploying a coiled tubing with a fiber optic line, the fiber optic line having a diameter of about 0.125 inches to about 0.25 inches.

22. The method of claim 21 wherein the diameter of the fiber optic line provides a suitable channel within the coiled tubing for carrying fluid for performing the application.

\* \* \* \* \*